(12) United States Patent
Cyborski (10) Patent No.: US 11,545,871 B2
(45) Date of Patent: Jan. 3, 2023

(54) TOOL HOUSING AND MOTOR EXHAUST MANAGEMENT

(71) Applicant: Snap-on Incorporated, Kenosha, WI (US)

(72) Inventor: David A. Cyborski, Kenosha, WI (US)

(73) Assignee: Snap-on Incorporated, Kenosha, WI (US)

(\*) Notice: Subject to any disclaimer, the term of this patent is extended or adjusted under 35 U.S.C. 154(b) by 108 days.

(21) Appl. No.: 17/010,528

(22) Filed: Sep. 2, 2020

(65) Prior Publication Data

US 2022/0069662 A1   Mar. 3, 2022

(51) Int. Cl.
*H02K 5/04* (2006.01)
*H02K 5/20* (2006.01)
*B25F 5/00* (2006.01)
*H02K 9/16* (2006.01)
*H02K 7/14* (2006.01)
*B25B 21/00* (2006.01)

(52) U.S. Cl.
CPC ............... *H02K 5/20* (2013.01); *B25F 5/008* (2013.01); *H02K 7/145* (2013.01); *H02K 9/16* (2013.01); *B25B 21/004* (2013.01); *H02K 2205/09* (2013.01)

(58) Field of Classification Search
CPC .............. H02K 5/04; H02K 5/10; H02K 5/20
See application file for complete search history.

(56) References Cited

U.S. PATENT DOCUMENTS

| 3,903,440 | A | 9/1975 | Paule et al. |
| 5,624,000 | A | 4/1997 | Miller |
| 6,043,575 | A | 3/2000 | Ghode et al. |
| 6,144,121 | A * | 11/2000 | Ishida ................. B25F 5/008 310/47 |
| 8,049,380 | B2 | 11/2011 | Li et al. |
| 8,508,084 | B2 | 8/2013 | Satterfield et al. |
| 9,132,542 | B2 | 9/2015 | Lau et al. |
| 2010/0277014 | A1* | 11/2010 | Hicks ................. H02K 11/026 333/172 |

(Continued)

FOREIGN PATENT DOCUMENTS

CN    103223655      7/2013
CN    203305188 U    11/2013

(Continued)

OTHER PUBLICATIONS

US 5,986,363 A, 11/1999, Ishida et al. (withdrawn)

(Continued)

*Primary Examiner* — Dang D Le (74) *Attorney, Agent, or Firm* — Seyfarth Shaw LLP (57) ABSTRACT

A motorized hand tool such as a cordless ratchet wrench that has a motor, and a housing that encloses or houses the motor. The motor includes one or more exhaust ports that expel exhaust air out of the motor. The housing includes one or more exhaust ports and inwardly projecting protrusions or deflectors that extend around the exhaust ports. The inwardly projecting protrusions/deflectors extend in a direction towards the motor exhaust ports, and/or are at least partially disposed in the motor exhaust ports to direct exhaust air out of the housing and prevent exhaust air from recirculating near the motor and electronic components of the tool.

14 Claims, 8 Drawing Sheets

(56) References Cited

U.S. PATENT DOCUMENTS

2020/0023506 A1* 1/2020 Justis .................... B25F 5/00

FOREIGN PATENT DOCUMENTS

| DE | 102014103854 | 9/2015 |
| EP | 0189768 | 8/1986 |
| EP | 3450111 A1 | 3/2019 |
| TW | 369461 | 9/1999 |
| WO | 2015029359 A1 | 3/2015 |

OTHER PUBLICATIONS

Taiwan Office Action for corresponding Application No. 11021198430 dated Dec. 7, 2021, 8 pages.
United Kingdom Combined Search and Examination Report for corresponding Application No. GB2112442.5 dated Feb. 24, 2022, 8 pages.
Taiwan Office Action for corresponding Application No. 11120532400 dated Jun. 1, 2022, 6 pages.

* cited by examiner

TOOL HOUSING AND MOTOR EXHAUST MANAGEMENT

TECHNICAL FIELD OF THE INVENTION

The present invention relates to a tool housing for providing restriction of motor exhaust air recirculation.

BACKGROUND OF THE INVENTION

Power hand tools, such as, for example, motorized ratchet wrenches and drivers, are commonly used in automotive, industrial and household applications to install and remove threaded fasteners and apply a torque and/or angular displacement to a work piece, such as a threaded fastener, for example. Power hand tools such as cordless power ratchets and drivers generally include an electric motor contained in a clamshell type housing along with other electronic components and batteries. The clamshell housing generally includes two or more housing portions fastened together by fasteners such as screws or rivets.

Cooling the motor and other electronic components is important, but can be difficult. The motor pulls external air into the motor, which is then heated by the motor during operation, in order to cool the motor. This heated air is then expelled out of the motor as exhaust air. Current solutions for handling the exhaust air include placing slots in the housing of the tool in a vicinity of the motor to allow the exhaust air to be expelled out of the housing.

However, improper or inefficient direction of the exhaust air out of the housing of the tool can cause the exhaust air to recirculate within the tool housing near the motor and other electronic components, and add heat, instead of removing heat, from the motor and other components. Other components in the housing of the tool may also generate heat and cause air in the tool housing to be heat saturated and unable to absorb heat. Thus, recirculated exhaust air can be problematic if allowed to recirculate in the housing. For example, improper or inefficient handling of exhaust air can cause the motor and/or other components to overheat and fail, rendering the tool inoperable.

SUMMARY OF THE INVENTION

The present invention relates broadly to a motorized hand tool, such as a cordless ratchet wrench, that has a motor and a housing that encloses or houses the motor and other components. The motor includes one or more exhaust ports that expel exhaust air from the motor. Motor and electronic component (such as, a controller or printed circuit board) cooling in cordless ratchet wrenches is important due to a high number of motor stalling events that are generally experienced during normal use. To restrict exhaust air from recirculating in the housing near the motor and electronic components of the tool, the housing includes one or more exhaust ports and inwardly projecting protrusions or deflectors that extend around the periphery of the exhaust ports. The inwardly projecting protrusions/deflectors extend in a direction towards the motor exhaust ports, and/or are at least partially disposed or extend into the motor exhaust ports to effectively direct exhaust air out of the housing and restrict exhaust air from recirculating near the motor and electronic components of the tool.

In an embodiment, the present invention broadly relates to a housing for a tool, wherein the housing is adapted to house a motor having one or more motor exhaust ports. The housing includes a first outlet port disposed in the housing, and a first deflector extending around the first outlet port. An end of the first deflector is adapted to be disposed proximal to a first motor exhaust port and direct exhaust air from the motor out of the housing.

In another embodiment, the present invention broadly relates to a tool housing adapted to house a motor having first and second motor exhaust ports and a motor inlet port. The tool housing includes first and second clamshell housing portions coupled together to cooperatively form the tool housing. The first clamshell housing portion includes a first outlet port disposed in the first clamshell housing, and a first deflector extending around the periphery of the first outlet port, wherein an end of the first deflector is adapted to be disposed proximal to the first motor exhaust port and direct exhaust air away from the motor and out of the tool housing. The second clamshell housing portion similarly includes a second outlet port disposed in the second clamshell housing, and a second deflector extending around the periphery of the second outlet port, wherein an end of the second deflector is adapted to be disposed proximal to the second motor exhaust port and direct exhaust air away from the motor and out of the tool housing.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a motorized hand tool, such as, for example, a cordless ratchet wrench, that has a motor and a housing that encloses or houses the motor. The motor includes one or more exhaust ports that expel exhaust air out of and away from the motor. Motor and electronic component (such as, a controller or printed circuit board) cooling in cordless ratchet wrenches is important due to a high number of motor stalling events that are generally experienced during normal use. To restrict exhaust air from recirculating in the housing near the motor and electronic components of the tool, the housing includes one or more exhaust ports and inwardly projecting protrusions or deflectors that extend around the peripheries of the exhaust ports. The inwardly projecting protrusions/deflectors extend in a direction towards the motor exhaust ports, and/or are at least partially disposed or extend into the motor exhaust ports to effectively direct exhaust air away from the motor and out of the housing and further restrict exhaust air from recirculating near the motor and electronic components of the tool.

Referring to FIGS. 1-5, a tool housing 102 for a tool, such as, for example, a cordless ratchet tool, is shown. The tool housing 102 may include first and second housing portions 104 and 106 that are coupled together in a clamshell type manner to cooperatively form the tool housing 102. The tool housing 102 includes first and second ends 108, 110. The first end 108 is adapted to couple to a torque application head, such as a ratchet head, and the second end 110 is adapted to receive a power source, such as a battery. The tool housing 102 may enclose or house an electric motor 112 (as described in further detail below) and one or more other electronic components, such as a switch mechanism, controller, and other components for configuring, setting, and operating the tool. The tool housing 102 may also include a textured grip to improve a user's grasp of the tool during torqueing operations.

The first housing portion 104 includes one or more first inlet air ports 114 and one or more first outlet air ports 116. As illustrated, the first inlet air ports 114 are disposed substantially in a central portion of the first housing portion 104 between the first and second ends 108, 110. However, the first inlet air ports 114 may be disposed in other locations, as long as the first inlet air ports 114 are disposed proximal to motor inlet air ports of the motor 112 when assembled, as described in further detail below. Similarly, the first outlet air ports 116 are disposed proximal to the first end 108, but can be disposed in other locations, as long as the first outlet air ports 116 substantially align with motor outlet air ports of the motor 112 when assembled, as described in further detail below.

Figure 1:
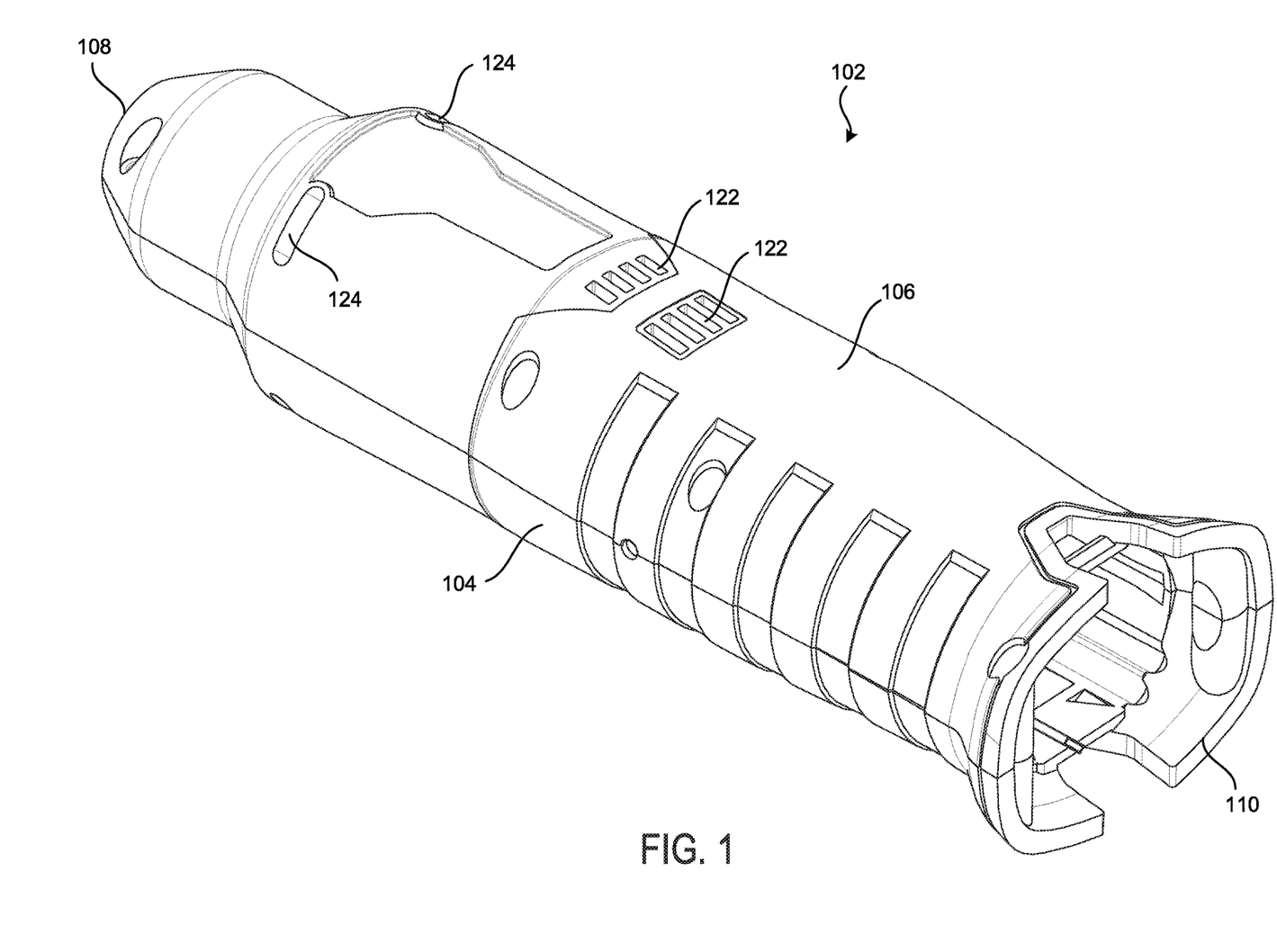
FIG. 1 is a perspective view of a tool housing, according to an embodiment of the present invention.
Figure 2:
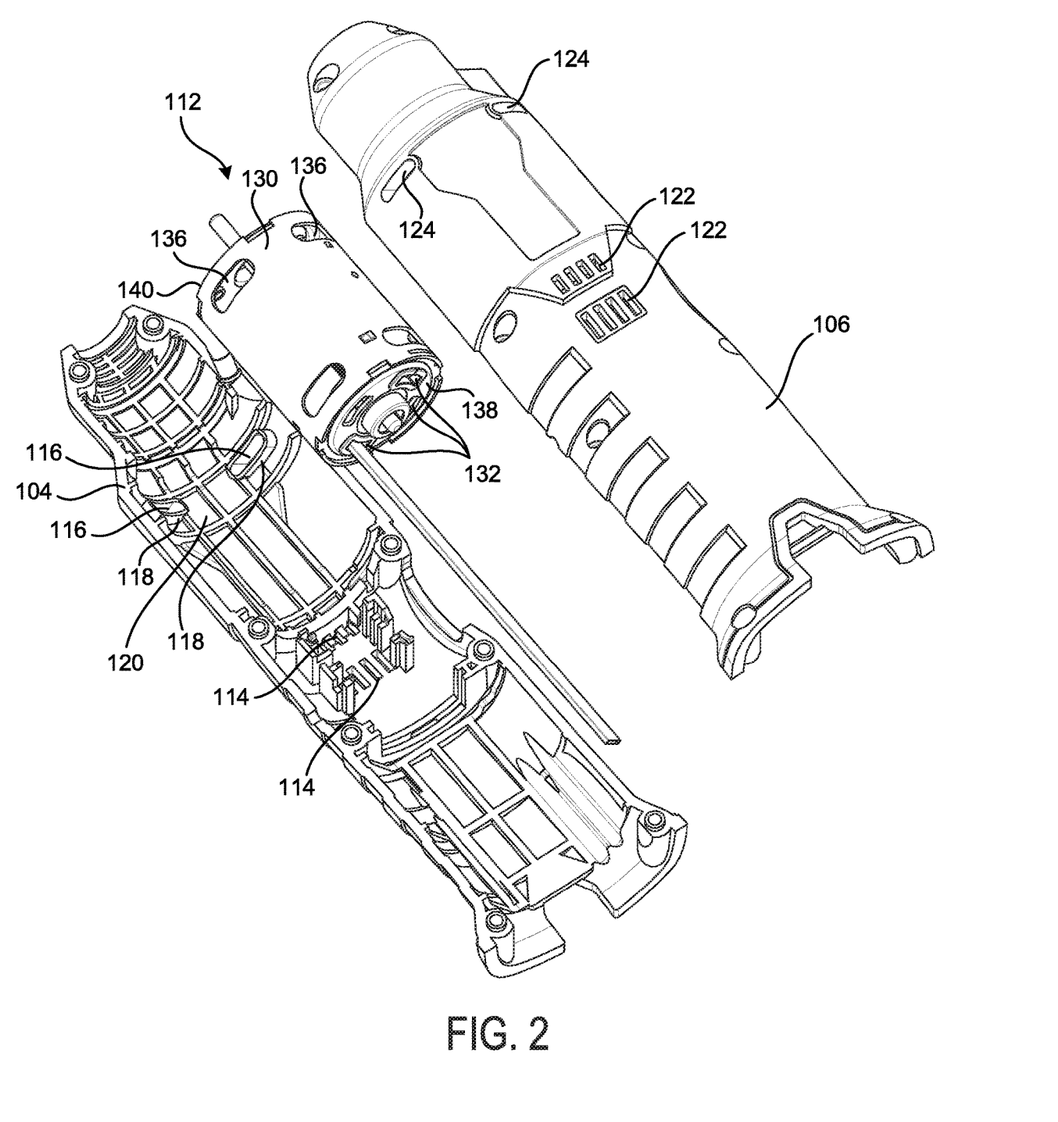
FIG. 2 is first perspective exploded view of the tool housing of FIG. 1 including a motor, according to an embodiment of the present invention.

Referring to FIG. 2, the first housing portion 104 also includes inwardly protruding first deflectors 118 respectively disposed around peripheries of the first outlet air ports 116. Each first deflector 118 extends from a first inner surface 120 of the first housing portion 104 inwardly into the housing 102. Each first deflector 118 is sized and shaped to at least partially fit into or be at least partially disposed in a respective motor outlet exhaust port to provide a vent or exhaust tube effect that effectively directs exhaust air away from the motor 112 and out of the tool housing 102.

In a similar manner, referring further to FIGS. 1-5, the second housing portion 106 includes one or more second inlet air ports 122 and one or more second outlet air ports 124. As illustrated, the second inlet air ports 122 are disposed substantially in a central portion of the second housing portion 106 between the first and second ends 108, 110. However, the second inlet air ports 122 may be disposed in other locations, as long as the second inlet air ports 122 are disposed proximal to motor inlet air ports of the motor 112 when assembled, as described in further detail below. Similarly, the second outlet air ports 124 are disposed proximal to the first end 108, but can be disposed in other locations, as long as the second outlet air ports 124 substantially align with motor outlet exhaust ports of the motor 112 when assembled, as described in further detail below.

Figure 3:
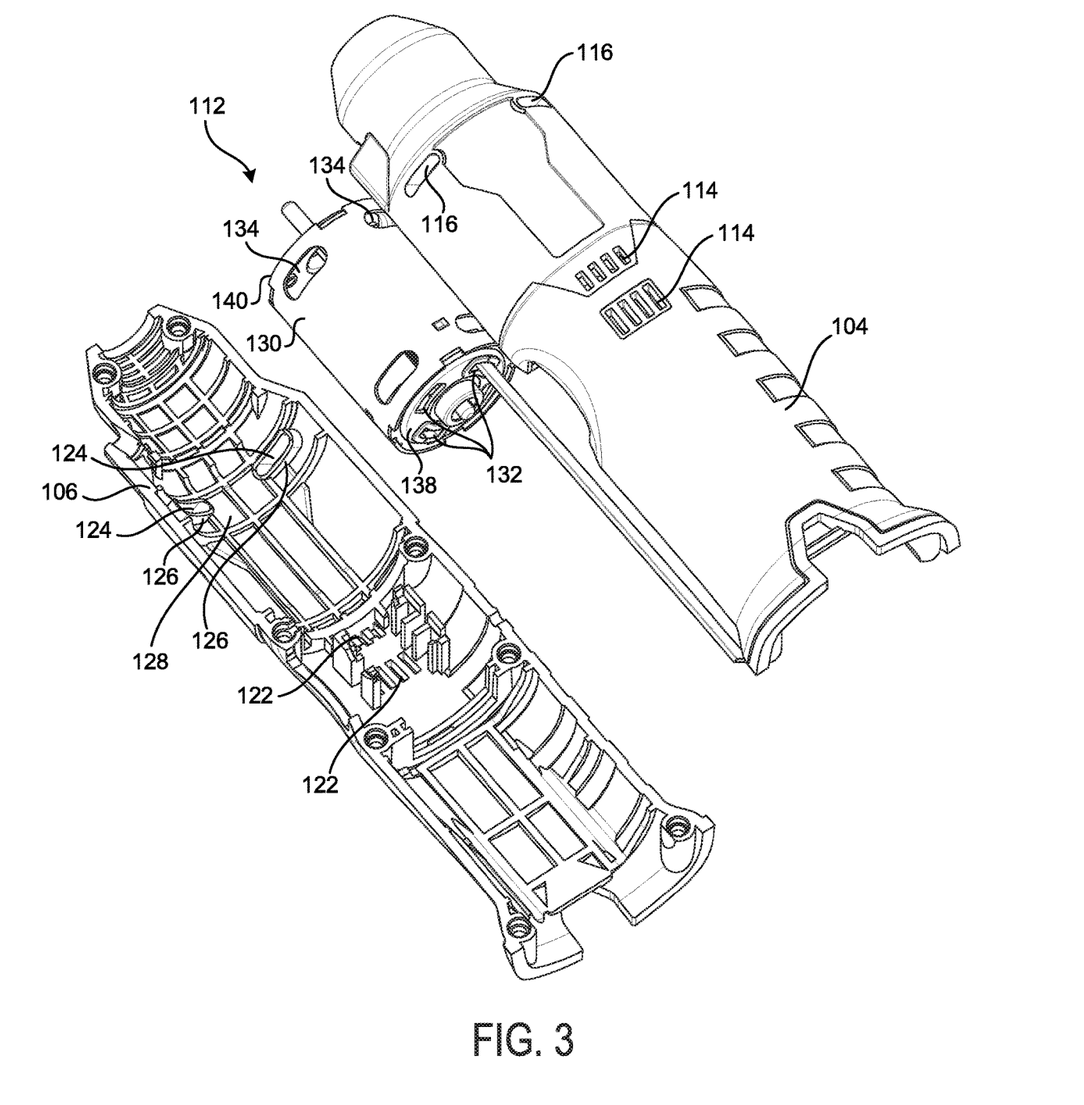
FIG. 3 is second perspective exploded view of the tool housing of FIG. 1 including a motor, according to an embodiment of the present invention.
Figure 4:
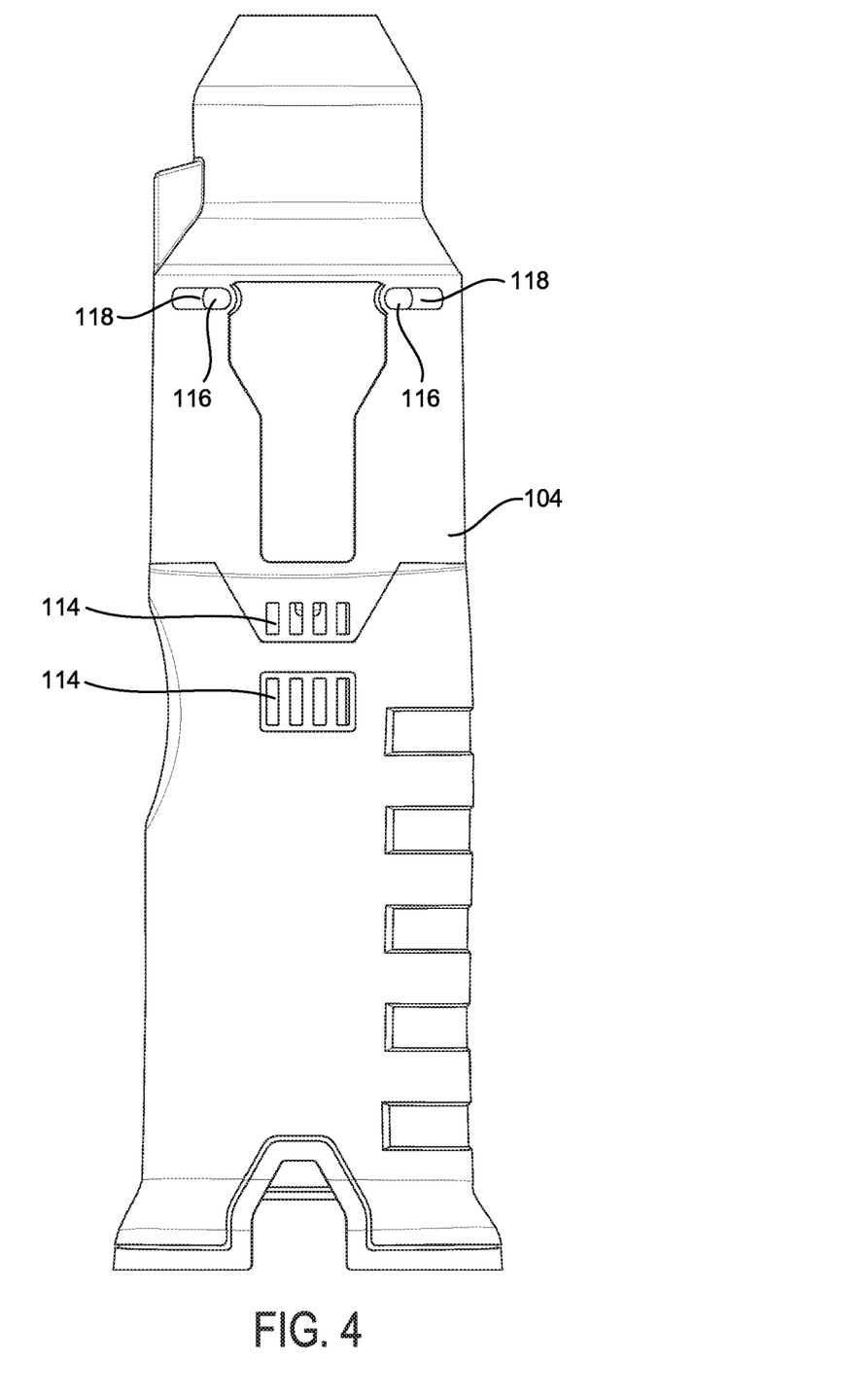
FIG. 4 is a side view of a first housing portion of the tool housing of FIG. 1, according to an embodiment of the present invention.
Figure 5:
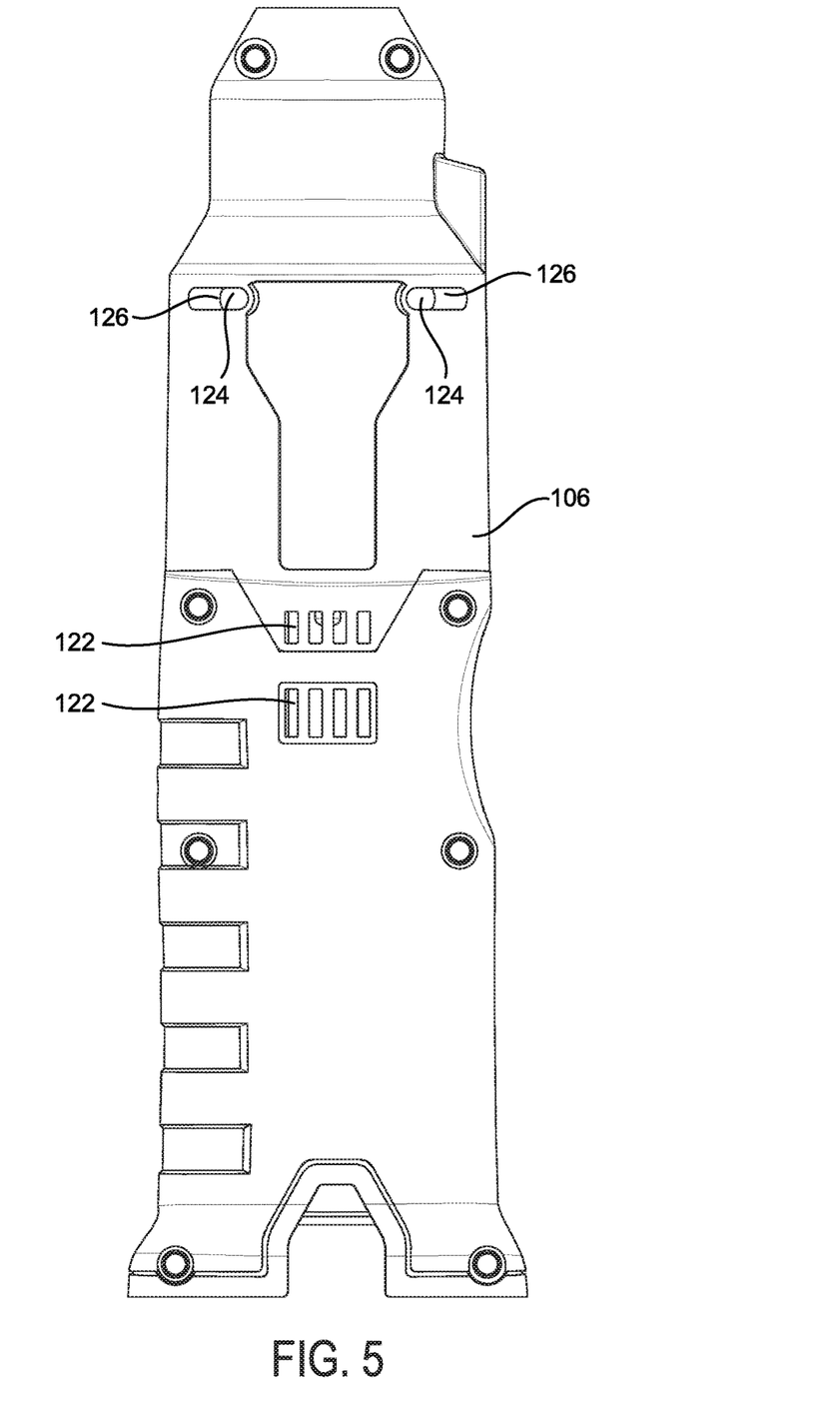
FIG. 5 is a side view of a second housing portion of the tool housing of FIG. 1, according to an embodiment of the present invention.

Referring to FIG. 3, the second housing portion 106 also includes inwardly protruding second deflectors 126 respectively disposed around peripheries of the second outlet air ports 124. Each second deflector 126 extends from a second inner surface 128 of the second housing portion 106 inwardly into the housing 102. Each second deflector 126 is sized and shaped to at least partially fit into or be at least partially disposed in a respective motor outlet exhaust port to provide a vent or exhaust tube effect that effectively directs exhaust air away from the motor 112 and out of the tool housing 102.

Figure 6:
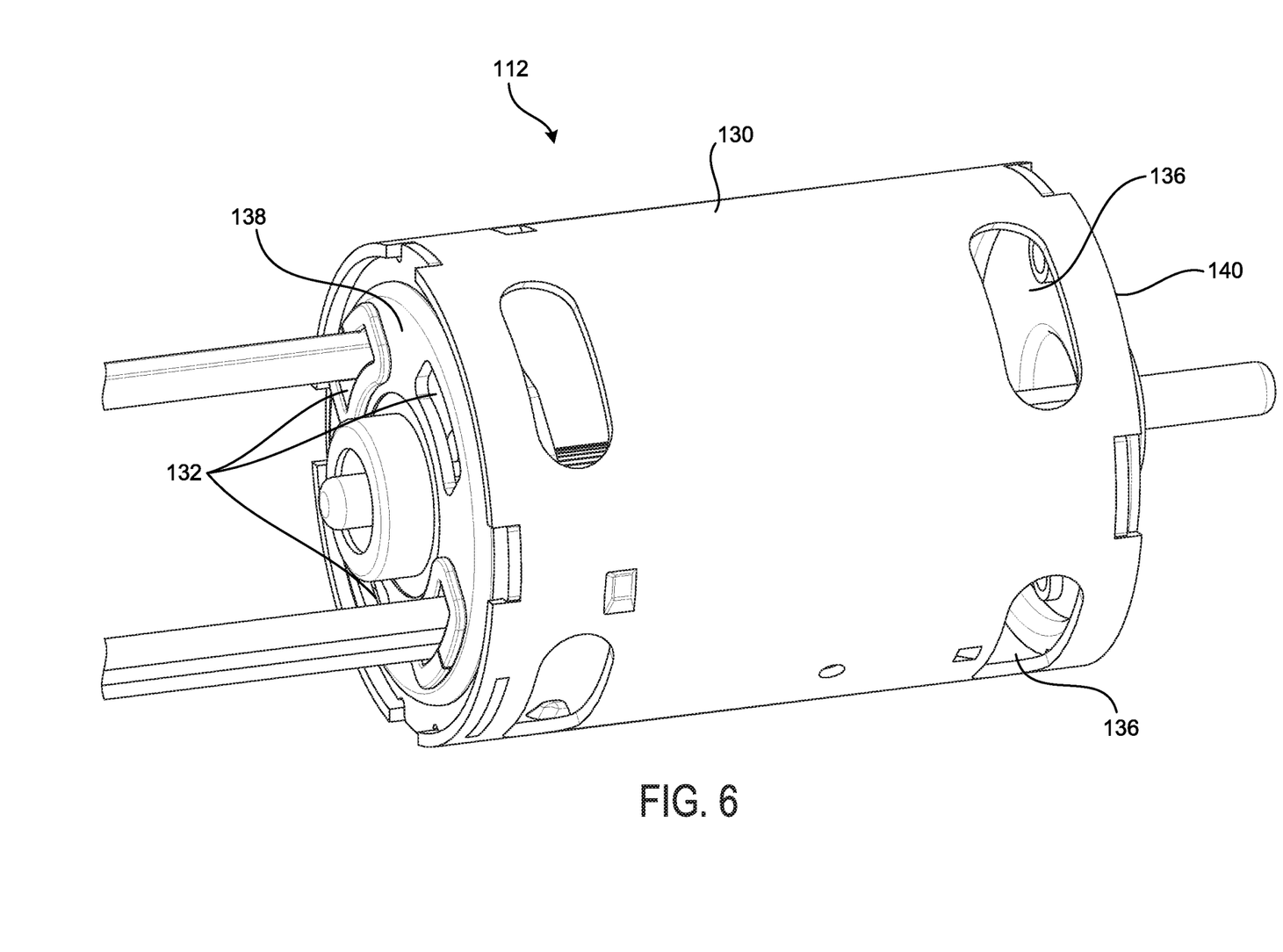
FIG. 6 is a perspective side view of a motor, according to an embodiment of the present invention.

Referring to FIGS. 2, 3, and 6, the motor 112 may be a brushless or brushed type motor, or any other suitable motor. In an embodiment, the motor 112 includes a motor casing or motor housing 130, one or more motor inlet ports 132, one or more first motor outlet or exhaust ports 134, and one or more second motor outlet ports 136. As illustrated, the motor inlet ports 132 are disposed on an end cap 138 of the motor 112. However, the motor inlet ports 132 may be disposed in other operable locations, such as in the motor housing 130 proximal to the end cap 138.

The first motor outlet ports 134 and second motor outlet ports 136 are disposed in and extend through the motor casing 130 proximal to a front end 140 of the motor 112, opposite the end cap 138. The first motor outlet ports 134 are also disposed on a first side of the motor 112, and the second motor outlet ports 136 are disposed on a second side of the motor 112. However, the first motor outlet ports 134 and second motor outlet ports 136 may be disposed in other operable locations. In an embodiment, the first motor outlet ports 134 and second motor outlet ports 136 are in a diametrically opposing relationship. As illustrated, there are also two first motor outlet ports 134 and two second motor outlet ports 136, however there may be more or less than two.

Referring to FIGS. 2, 3, 7, and 8, the motor 112 is disposed in the housing 102. The first inlet air ports 114 of the first housing portion 104 and the second inlet air ports 122 of the second housing portion 106 are disposed proximal to the motor inlet ports 122. This allows the motor 112 to pull air from external to the housing 102 into the motor 112 via the motor inlet ports 132 to cool the motor during operation. The first deflectors 118 respectively disposed around the peripheries of the first outlet air ports 116 respectively extend in a direction towards the first motor outlet ports 134, and are respectively disposed proximal to the first motor outlet ports 134. In an embodiment, the first deflectors 118 respectively extend, at least partially, into the first motor outlet ports 134. Similarly, the second deflectors 126 respectively disposed around the peripheries of the second outlet air ports 124 respectively extend in a direction towards the second motor outlet ports 136, and are respectively disposed proximal to the second motor outlet ports 136. In an embodiment, the second deflectors 126 respectively extend, at least partially, into the second motor outlet ports 136. Thus, during operation, the motor 112 expels exhaust air out of the first and second motor outlet ports 134, 136, and the first and second deflectors 118, 126 provides a vent or exhaust tube effect that effectively directs exhaust air away from the motor 112 and out of the tool housing 102 via the first and second outlet air ports 116, 124.

Figure 7:
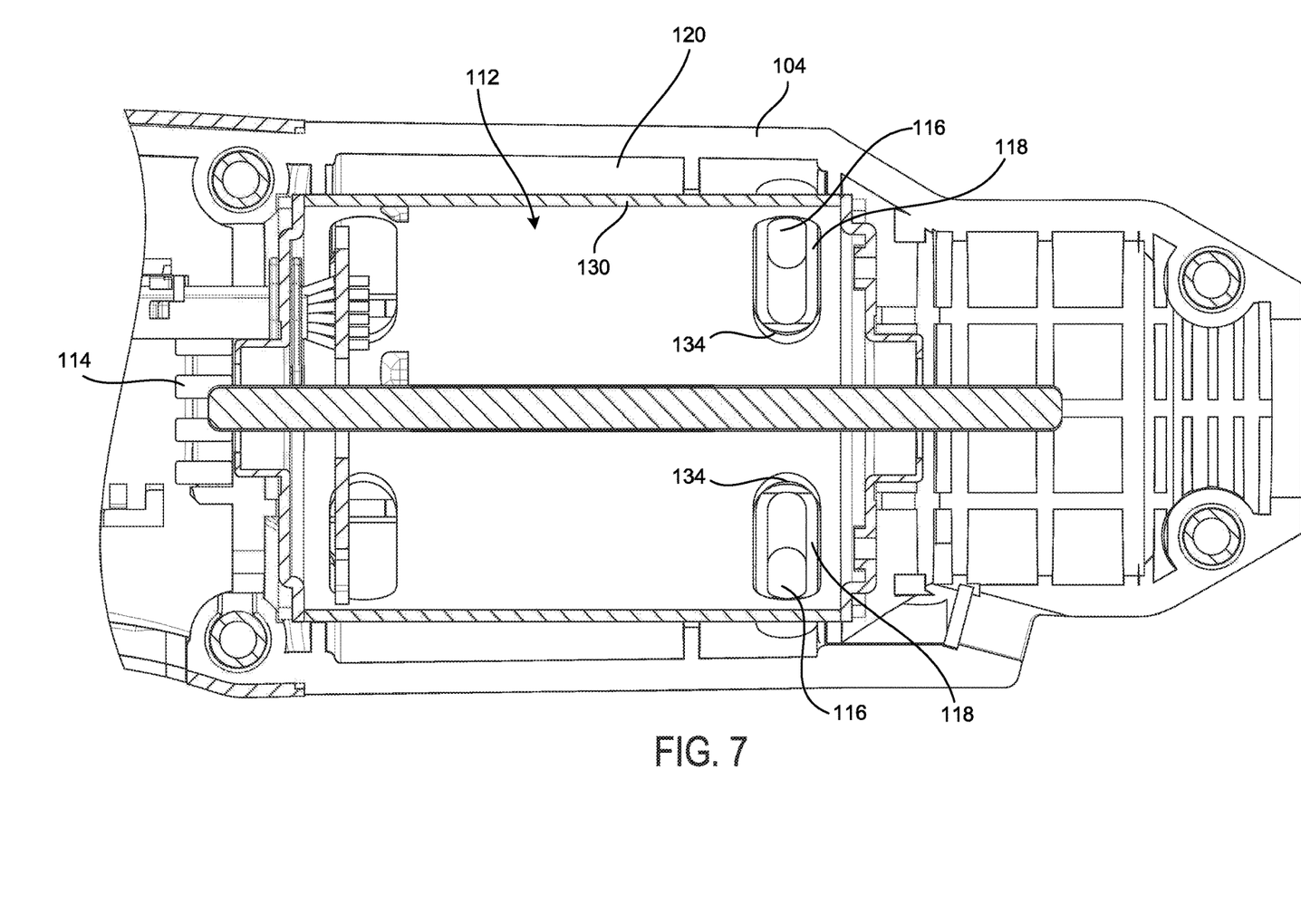
FIG. 7 is a partial cut away view taken along a longitudinal axis of the motor with the motor disposed in the first housing portion, according to an embodiment of the present invention.
Figure 8:
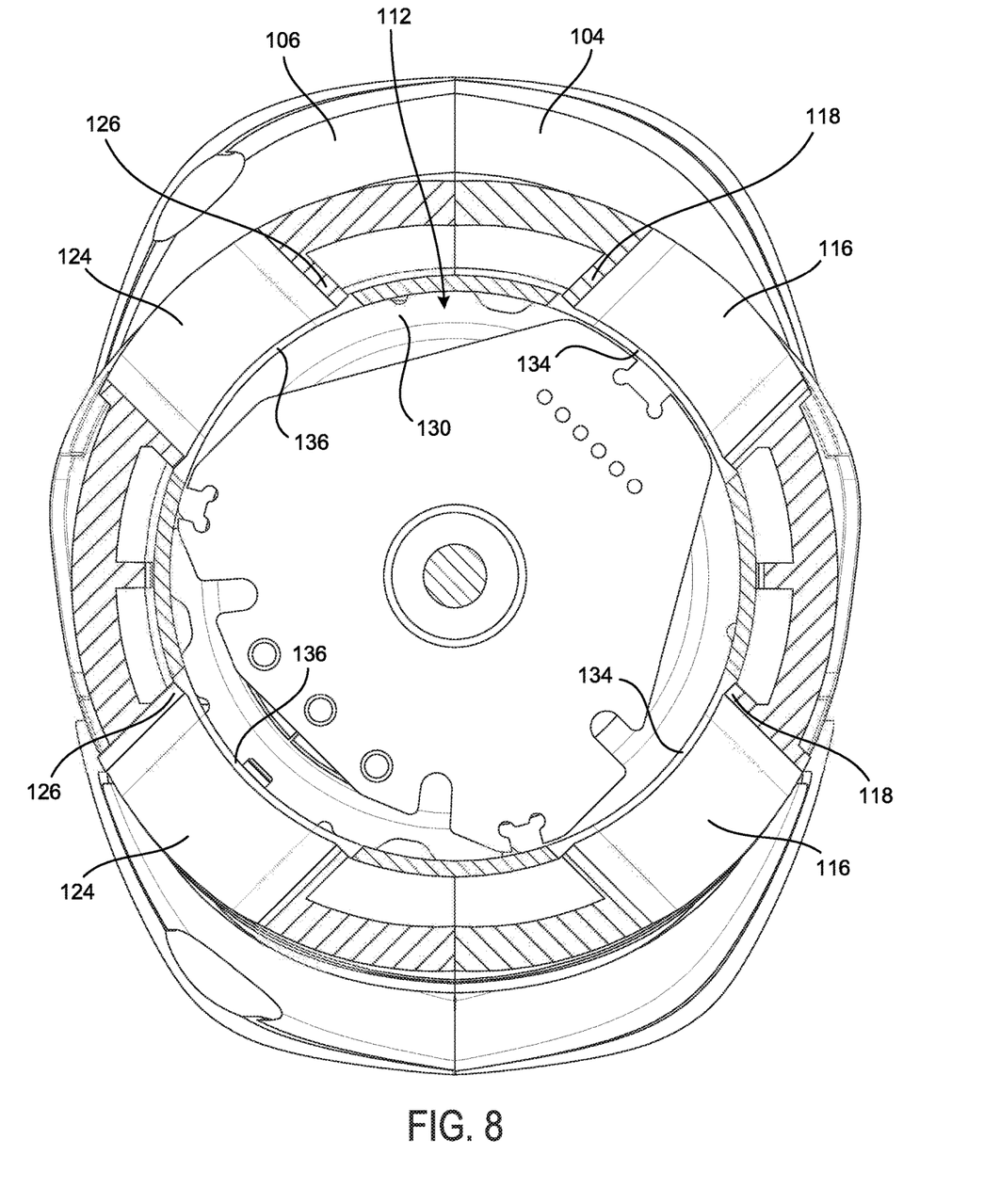
FIG. 8 is a partial cut away view taken perpendicular to a longitudinal axis of the motor with the motor disposed in the first and second housing portions, according to an embodiment of the present invention.

The first and second deflectors 118, 126 further restrict exhaust air from unintentionally flowing or recirculating within the motor 112 and housing 102. The first and second deflectors 118, 126, effectively direct exhausted air out of the tool housing 102, and further restrict exhaust air from recirculating in the housing 102 and undesirably heating the motor 112 and electronic components of the tool.

The tool housing 102 may house and couple to other components that are used to operate a tool. For example, the tool may further include a ratchet head coupled to the tool housing 102 at the first end 108, the motor 112, a trigger that can be actuated by a user to cause the tool to operate. For example, the user can depress the trigger inwardly to cause power to be drawn from a power source and cause a motor to provide torque to the ratchet head in a desired rotational direction. Any suitable trigger and switch mechanism can be implemented without departing from the spirit and scope of the present invention. For example, the trigger may also be biased such that the trigger is depressible inwardly, relative to the tool, to cause the tool to operate, and a release of the trigger causes the trigger to move outwardly, relative to the tool, to cease operation of the tool via the biased nature of the trigger. The trigger and switch mechanism may also be a variable speed type mechanism. In this regard, actuation or depression of the trigger causes the motor operate at a faster speed the further the trigger is depressed.

An example ratchet head includes a drive or drive lug, and selector knob, for example. The drive is adapted to apply torque to a work piece, such as a fastener, via an adapter, bit, or socket coupled to the drive, such as a bi-directional ratcheting square or hexagonal drive. The drive may be a "male" connector designed to fit into or cooperatively engage a female counterpart. However, the drive may alternatively be a "female" connector designed to engage a male counterpart. The drive may also be structured to directly engage a work piece without requiring coupling to an adapter, bit, or socket. The rotational direction of the drive can be selected by rotation of the selector knob to be either a first or second rotational direction (such as, clockwise or counterclockwise).

The motor 112 is adapted to operably engage the ratchet head, and provide torque to the tool and, in turn, to the drive. A power source can be associated with the tool to provide electronic or other forms of power to the tool, such as, for example, electric, hydraulic, or pneumatic, to drive the motor 112. In an embodiment, the power source can be housed in the second end 110 of the tool housing 102, or any other portion of the tool/tool housing 102. The power source may also be an external component that is not housed by the tool, but that is operatively coupled to the tool through, for example, wired or wireless means. In an embodiment, the power source is a battery that is adapted to be disposed in the end of the tool housing 102 and electrically couple to corresponding terminals of the tool.

The motor 112 and switch mechanism are typically disposed in the tool housing 102, and the switch mechanism is operably coupled to the motor 112. The actuatable trigger is also operably coupled to the switch mechanism, such that actuation of the trigger (such as depression of the trigger) causes the motor 112 to operate and rotate the drive in either one of first and second rotational directions (clockwise or counterclockwise) in a well-known manner. The switch mechanism may also be operably coupled to a controller (which may include a printed circuit board) including the terminals or battery contacts that couple to corresponding electrical contacts on a removable battery.

As discussed herein, the tool housing 102 is part of a ratchet type wrench. However, the tool housing 102 can be incorporated into any electrically powered or hand-held tool, including, without limitation, a drill, router, or impact wrench, ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A housing for a tool and that is adapted to house a motor having a first motor exhaust port, the housing comprising:
    a first outlet port disposed in the housing and having a first outlet port periphery adapted to align with the first motor exhaust port; and
    a first deflector disposed around the first outlet port periphery, wherein an end of the first deflector is adapted to be at least partially disposed in the first motor exhaust port and direct exhaust air from the motor out of the housing.

2. The housing of claim 1, further comprising a first housing portion, wherein the first outlet is disposed in the first housing portion.

3. The housing of claim 2, wherein the first deflector protrudes inwardly from a first inner surface of the first housing portion.

4. The housing of claim 2, further comprising a second housing portion coupled to the first housing portion to cooperatively form the housing.

5. The housing of claim 4, further comprising a second outlet port disposed in the second housing portion and having a second outlet port periphery.

6. The housing of claim 5, further comprising a second deflector disposed around the second outlet port periphery, wherein an end of the second deflector is adapted to be disposed proximal to a second motor exhaust port and direct exhaust air from the motor out of the housing.

7. The housing of claim 6, wherein the second deflector protrudes inwardly from a second inner surface of the second housing portion, and the end of the second deflector is adapted to be at least partially disposed in the second motor exhaust port.

8. The housing of claim 6, further comprising a second inlet port disposed in the second housing portion and adapted to allow air external to the housing to be pulled into the housing by the motor.

9. The housing of claim 2, further comprising a first inlet port disposed in the first housing portion and adapted to allow air external to the housing to be pulled into the housing by the motor.

10. A tool housing adapted to house a motor having first and second motor exhaust ports and a motor inlet port, the tool housing comprising:
   a first clamshell housing portion including:
      a first outlet port having a first outlet port periphery adapted to align with the first motor exhaust port; and
      a first deflector disposed around the first outlet port periphery, wherein an end of the first deflector is adapted to be at least partially disposed in the first motor exhaust port and direct exhaust air from the motor out of the tool housing; and
   a second clamshell housing portion including:
      a second outlet port having a second outlet port periphery adapted to align with the second motor exhaust port; and
      a second deflector disposed around the second outlet port periphery, wherein an end of the second deflector is adapted to be at least partially disposed in the second motor exhaust port and direct exhaust air from the motor out of the tool housing.

11. The tool housing of claim 10, wherein the first deflector protrudes inwardly from a first inner surface of the first clamshell housing portion.

12. The tool housing of claim 11, wherein the first clamshell housing portion further includes a first inlet port disposed in the first clamshell housing portion and is adapted to allow air external to the tool housing to be pulled into the tool housing.

13. The tool housing of claim 12, wherein the second deflector protrudes inwardly from a second inner surface of the second clamshell housing portion.

14. The tool housing of claim 13, wherein the second clamshell housing portion further includes a second inlet port disposed in the second clamshell housing portion and is adapted to allow air external to the tool housing to be pulled into the tool housing.

* * * * *